United States Patent [19]

Kikuyama et al.

[11] 3,989,967
[45] Nov. 2, 1976

[54] PULSE MOTOR

[75] Inventors: Akira Kikuyama; Nobuo Toyama; Shigekazu Takahashi, all of Ena, Japan

[73] Assignee: Ricoh Watch Co., Ltd., Tokyo, Japan

[22] Filed: Aug. 25, 1975

[21] Appl. No.: 607,248

[30] Foreign Application Priority Data

Aug. 28, 1974 Japan .............................. 49-98650
Aug. 12, 1974 Japan .............................. 49-141027

[52] U.S. Cl. .............................. 310/112; 310/49 R; 310/162; 310/164
[51] Int. Cl.² .............................. H02K 21/12
[58] Field of Search ............. 310/49, 162–165, 310/112, 114, 126, 156

[56] References Cited

UNITED STATES PATENTS

| 3,135,886 | 6/1964 | Kavanaugh | 310/112 |
|---|---|---|---|
| 3,372,291 | 3/1968 | Lytle et al. | 310/112 Y |
| 3,597,915 | 8/1971 | Aizawa et al. | 310/49 UX |
| 3,633,055 | 1/1972 | Maier | 310/156 |
| 3,731,125 | 5/1973 | Nikaido et al. | 310/49 |
| 3,878,414 | 4/1975 | Harakawa | 310/164 X |
| 3,909,646 | 9/1975 | Haydon | 310/164 |
| R28,075 | 7/1974 | Kavanaugh | 310/49 |

Primary Examiner—Donovan F. Duggan
Attorney, Agent, or Firm—Spensley, Horn, Lubitz

[57] ABSTRACT

A pulse motor comprising a rotor having at least two magnetization axes extending parallel to a shaft of the rotor and angularly spaced apart at a uniform interval, the direction of magnetization of each magnetization axis being opposite to that of the adjacent magnetization axis; a pair of upper stators extending above the rotor and defining two upper gaps between them, said upper gaps being adapted to face respective unlike polarity poles on the upper side of the rotor; a pair of lower stators extending below the rotor and defining two lower gaps between them, said lower gaps being adapted to face respective unlike polarity poles on the lower side of the rotor; and at least one drive coil for magnetizing the upper and lower pair stators alternately to opposite polarities such that the polarity of one of the upper pair stators and one of the lower pair stators is opposite to the polarity of the other upper and lower stators.

12 Claims, 8 Drawing Figures

PULSE MOTOR

BACKGROUND OF THE INVENTION

1. FIELD OF THE INVENTION

This invention relates to improvements in pulse motors, and more particularly in small size pulse motors such as those assembled into electronic watches.

2. DESCRIPTION OF THE PRIOR ART

FIG. 1 shows an example of the prior art pulse motor. In the Figure, R designates a rotor, $S_1$ and $S_2$ designate stators, and C designates a drive coil. The rotor R is rotatable about a shaft $R_1$, and it is diametrically magnetized and has N and S poles formed alternately along its circumference. The stators $S_1$ and $S_2$ are U-shaped and disposed to surround the circumference of the rotor R, with their poles $P_1$ and $P_2$ facing each other and also their poles $P_2$ and $P_4$ facing each other. The drive coil C is would on a bar-like yoke Y facing the poles $P_2$ and $P_4$. It is secured at its opposite ends by screws $I_1$ and $I_2$ to the stators $S_1$ and $S_2$.

With magnetization of the stators $S_1$ and $S_2$ to N and S poles alternately in accordance with an alternating pulse signal supplied to the drive coil C, the rotor R is intermittently rotated at a pitch corresponding to its interpole interval due to the attraction and repulsion of its poles.

The prior art pulse motor of the construction of FIG. 1 has a drawback in that the electromagnetic coupling is low, leading to inferior conversion efficiency. In addition, high positional accuracy is required for the individual magnetic poles. Further, since the rotor R is diametrically magnetized, not only the effective magnetization area is small but also there is a restriction that inexpensive rare earth cobalt magnets which are highly anisotropic cannot be used.

SUMMARY OF THE INVENTION

An object of the invention is to provide a pulse motor, which enjoys high conversion efficiency with increased electromagnetic coupling and less leakage flux.

Another object of the invention is to provide a pulse motor, which permits the use of an inexpensive and highly anisotropic magnet as the rotor.

A further object of the invention is to provide a pulse motor, which is small in size and nevertheless able to provide high torque.

A still further object of the invention is to provide a pulse motor, the operation of which is reliable and highly stable.

DETAILED DESCRIPTION OF THE PREFERRED EMBODIMENTS

Figure 1:
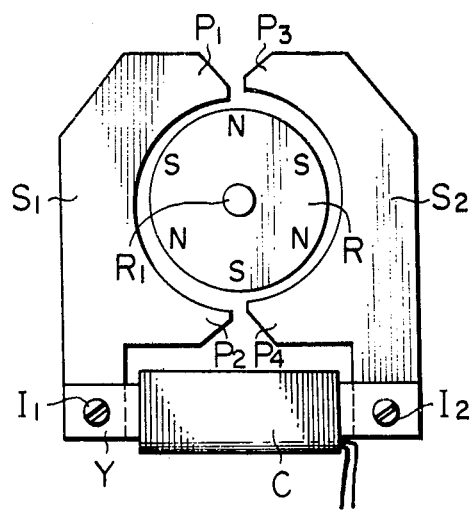
FIG. 1 is a plan view showing a prior-art pulse motor.
Figure 2B:
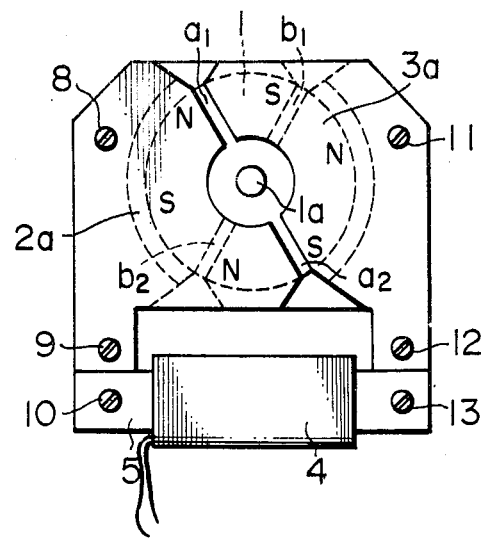
FIG. 2B is a plan view of the same.
Figure 2A:
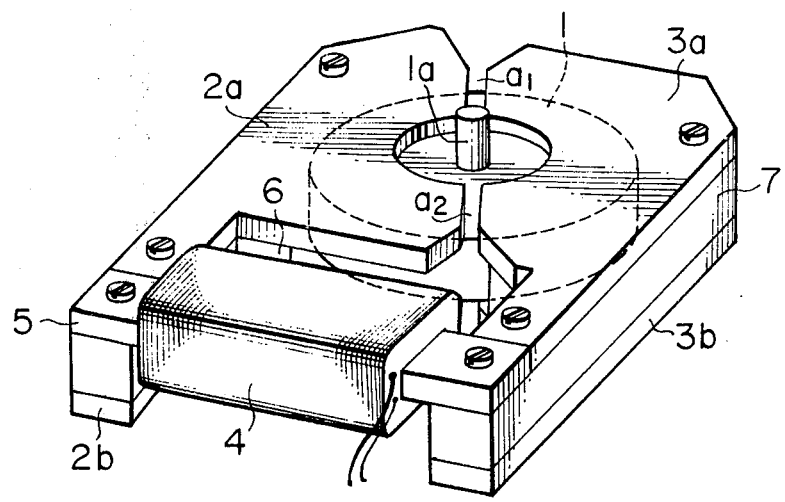
FIG. 2A is a perspective view showing an embodiment of the pulse motor according to the invention.

Referring now to FIGS. 2A and 2B, there is shown a first embodiment of the pulse motor according to the invention. In the Figures, designated at 1 is a rotor, which is rotatable about a shaft $1a$. The rotor 1 has 6 magnetization axes extending parallel to the shaft $1a$. The magnetization axes lie in a cylindrical surface coaxial with the shaft $1a$ and are uniformly spaced apart an an angular interval of 60°, and the direction of magnetization of each magnetization axis is opposite to that of the adjacent one. In other words, N and S poles are alternately arranged on each side of the rotor 1 at an angular interval of 60°, and the phase difference between the upper and lower sides of the rotor is also 60°.

A pair of upper stators $2a$ and $3a$ are circumferentially disposed above the rotor 1 and extend over the top of the rotor 1 at right angles to the shaft $1a$. The upper stators $2a$ and $3a$ face different poles on the upper surface of the rotor 1 and define two upper gaps $a_1$ and $a_2$ which are symmetrical with each other with respect to the shaft $1a$. Below the rotor 1 a pair of lower stators $2b$ and $3b$ are circumferentially disposed and extend over the bottom of the rotor 1 at right angles to the shaft $1a$. The lower stators $2b$ and $3b$ face different poles on the lower surface of the rotor 1 and define two lower gaps $b_1$ and $b_2$ which are symmetrical with each other with respect to the shaft $1a$. The gaps $a_1$ and $a_2$ arranged are 60° out-of-phase with respect to the gaps $b_1$ and $b_2$. The space between each of the respective gaps is of a predetermined distance. Designated at 4 is a drive coil, which is wound on a yoke 5 magnetically coupled to the upper and lower pair stators. The upper and lower stators $2a$ and $2b$ are spaced apart by a spacer 6 and are connected to the left hand end of the yoke 5. The other upper and lower stators $2b$ and $3b$ are spaced apart by a spacer 7 and are connected to the right hand end of the yoke 5. Designated at 8 to 13 are screws for securing the upper and lower stators, spacers and yoke to one another.

When the gaps $a_1$ and $a_2$ defined between the upper stators $2a$ and $3a$ face respective different poles on the upper surface of the rotor 1, the gaps $b_1$ and $b_2$ defined between the lower stators $2b$ and $3b$ face respective different poles on the lower surface of the rotor 1. Since the gaps $a_1$ and $a_2$ are arranged 60° out-of-phase with respect to the gaps $b_1$ and $b_2$ as mentioned earlier, the gaps $a_1$ and $b_1$ face like poles with respect to the respective poles faced by the gaps $a_2$ and $b_2$. With an alternating drive pulse signals supplied to the drive coil 4 via wires 100, magnetic attraction and repulsion of the rotor poles take place at the gaps $a_1$, $a_2$, $b_1$ and $b_2$ defined by the upper and lower stators, whereby the rotor 1 is rotated intermittently at a pitch corresponding to its interpole interval.

Figure 3A:
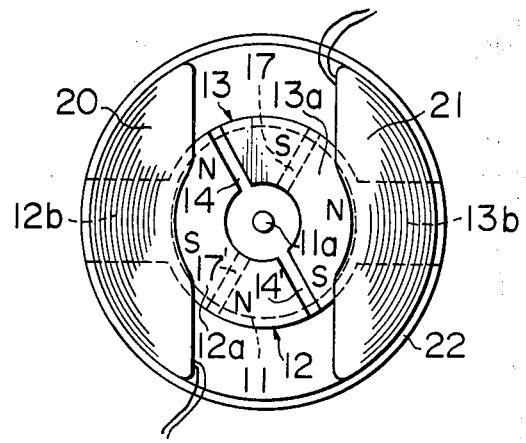
FIG. 3A is a plan view, with an upper fram removed, of another embodiment of the pulse motor according to the invention.
Figure 3B:
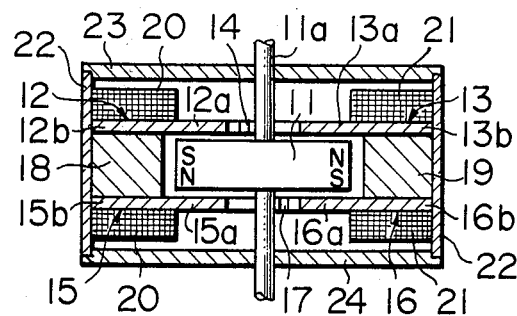
FIG. 3B is an axial sectional view of the same.

FIGS. 3A and 3B show a different embodiment of the pulse motor according to the invention. In these Figures, designated at 11 is a rotor rotatable about a shaft $11a$. The rotor 11 has six magnetization axes extending parallel to the shaft $11a$, that is, lying in a cylindrical surface coaxial with the shaft $11a$. The magnetization axes are uniformly spaced apart at angular intervals of 60°, and the direction of magnetization of each magnetization axis is opposite to that of the adjacent one. In other words, N and S poles are alternately arranged on each of the upper and lower sides of the rotor 1 at an angular interval of 60°, and there is a phase difference of 60° between the upper and lower surfaces of the rotor.

A pair of upper stators 12 and 13 are disposed above the rotor 11 and extend at right angles to the shaft 11a. The upper stators 12 and 13 consist of respective semi-circular head portions 12a and 13a and rectangular tail portions 12b and 13b. The semi-circular head portions 12a and 13a of the upper stators 12 and 13 have their respective opposite straight ends define two upper gaps 14 and 14', which are symmetrical with each other with respect to the shaft 11a and are adapted to face the poles on the upper surface of the rotor 11.

Another pair of stastors, namely lower stators 15 and 16, are disposed below the rotor 11 and extend at right angles to the shaft 11a. Like the upper stators 12 and 13, the lower stators 15 and 16 consist of respective semi-circular head portions 15a and 16a and rectangular tail portions 15b and 16b. Similar to the case of the upper stators 12 and 13, the semi-circular head portions 15a and 16a of the lower stators 15 and 16 have their respective opposite straight ends define two lower gaps 17 and 17', which are symmetrical with each other with respect to the shaft 11a and are adapted to face the poles on the lower surface of the rotor 11. The upper gaps 14 and 14' defined between the upper stators 12 and 13 are arranged 60° out-of-phase with respect to the lower gaps 17 and 17' defined between the lower stators 15 and 16. The lower stators 15 and 16, which are not shown, have entirely the same shape as the upper stators 12 and 13 except for the position of the gaps.

The rectangular tail portions 12b and 13b of the upper stators 12 and 13 are integral with the respective head portions 12a and 13a thereof and aligned to a line intersecting the axis of the shaft 11a. Similarly, the rectangular tail portions 15b and 16b of the lower stators 15 and 16 are integral with the respective head portions 15a and 16a thereof and aligned to a line intersecting the axis of the shaft 11a. The upper stators 12 and 13 are stacked with the respective lower stators 15 and 16 with a spacer 18 interposed between the tail portions 12b and 15b of the upper and lower stators 12 and 15 and another spacer 19 interposed between the tail portions 13b and 16b of the other upper and lower stators 15 and 16. The spacers 18 and 19 used here may be made of either magnetic or non-magnetic materials. A drive coil 20 is wound on the core constituted by the tail portions 12b and 15b with the spacer 18 clamped therebetween, and another drive coil 21 is wound on the core constituted by the tail portions 13b and 16b with the spacer 19 clamped therebetween. Wires 100a and 100b supply coils 20 and 21 with an alternating signal from any well known energy source. The upper and lower stators 12 and 15 are magnetized by the drive coil 20 to one polarity, while the other upper and lower stators 13 and 16 are magnetized by the drive coil 21 to the other polarity.

The whole construction described above, constituting the pulse motor, is housed in a casing comprising a cylindrical side frame 22 and upper and lower frames 23 and 24. The upper and lower frames 23 and 24 are made of a magnetic material.

Since the magnetic poles of the rotor are angularly spaced apart at an interval of 60°, when one of the poles on the upper surface of the rotor 11 is positioned near the upper gap 14, another pole of the opposite polarity to the pole near the gap 14 is always positioned near the other upper gap 14'. At this time, poles of opposite polarities are also positioned near the respective lower gaps 17 and 17'. Thus, if the rotor 11 is held at a fixed position with respect to the upper and lower stators, it experiences torques in the same direction as its two positions on the upper side and two positions on the lower side, that is, at a total of four positions, because the upper and lower stators 12 and 15 are magnetized to one polarity by the drive coil 20 while the other upper and lower stators 13 and 16 are magnetized to the other polarity by the drive coil 21 as mentioned earlier. This means that by supplying an alternating pulse signal to the drive coils 20 and 21 the rotor 11 can be rotated intermittently one step with each pulse after another.

In the preceding embodiments of the pulse motor, the rotor has had magnetization axes at the uniform angular spacing of 60°. This spacing of magnetization is, however, by no means limitative, and in general a spacing of $180/(l+1)°$ (where $l$ is a positive integer) is possible. In this case, the angular spacing of upper gaps or lower gaps or lower gaps can be $(2m-1)$ times the aforementioned $180/(l+1)°$ (with $m$ being a positive integer), but it is desirably around 180°. Further, the angular deviation or phase difference between the upper and lower gaps can be $(2n-1)$ times $180/(l+1)°$ (with $n$ being a positive integer) but is desirably as small as possible. In the preceding embodiments, $l$ is 2, $m$ is 2, and $n$ is 1. It will be seen that in this case the magnetization axes spacing of the rotor, given as $180/(l+1)°$, is 60°, the spacing of the upper or lower gaps, as given in this case by $(2m-1)$ times 60°, is 180°, and the angular deviation between the upper and lower gaps, as given in this case by $(2n-1)$ times 60°, is 60°. As a specific example other than the previous embodiments, it is possible to use a rotor having 8 magnetization axes at a spacing of 45° (with $i$ being 3) and set the spacing of the upper or lower gaps to 135° (with $m$ being 2) or 220° (with $m$ being 5) and the angular deviation between the upper and lower gaps to 45° (with $n$ being 1).

Further, while in the embodiment of FIGS. 3A and 3B the pulse motor construction is housed in the casing to facilitate the handling, the casing is not essential to the function of the pulse motor. Where the casing is used, it is desirable to use a magnetic material for at least part of the casing from the standpoint of facilitating the formation of the magnetic circuit and enhancing the conversion efficiency in the pulse motor.

Figure 4A:
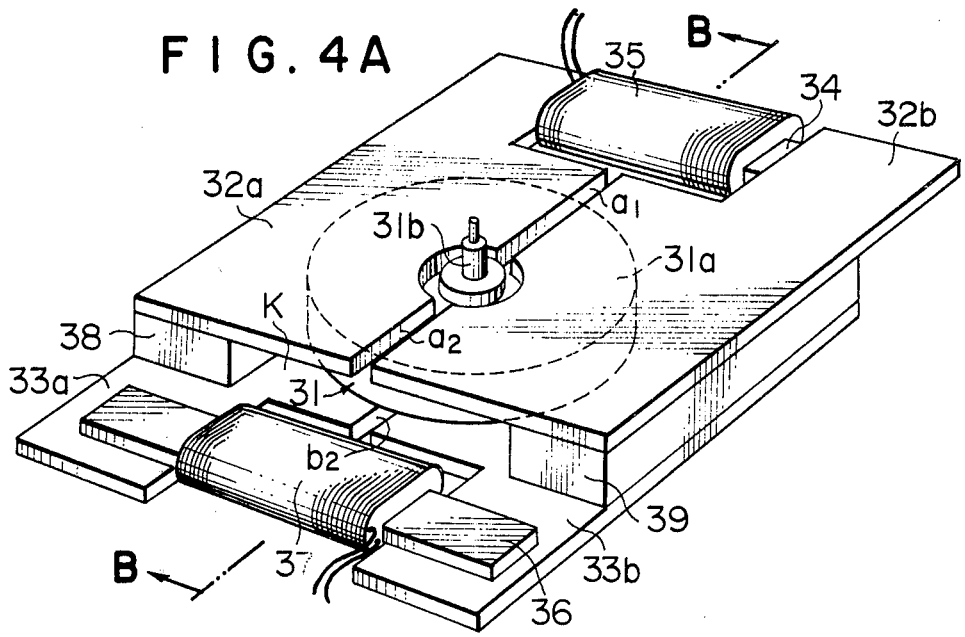
FIG. 4A is a perspective view showing a further embodiment of the pulse motor according to the invention.
Figure 4B:
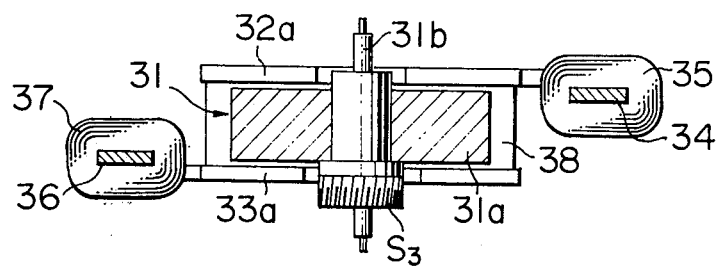
FIG. 4B is a sectional view taken along line B—B in FIG. 4A.
Figure 4C:
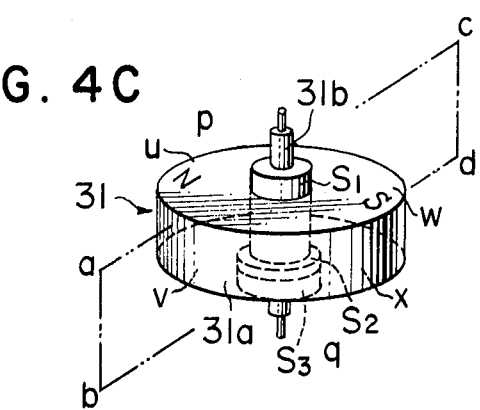
FIG. 4C is a perspective view of a rotor used in the same.

FIGS. 4A, 4B, and 4C show a further embodiment of the pulse motor according to the invention. This pulse motor is used for a drive mechanism in a wrist watch. In the Figures, designated at 31 is a rotor. This rotor 31 consists of a rotor body 31a and a shaft 31b. FIG. 4C shows the rotor 31 in perspective. As is clearly depicted in FIG. 4C, the rotor body 31a of the rotor 31 is cylindrical in form and axially magnetized such that in its half (p) on one side of a plane abcd, in which the axis of the shaft 31b lies, the upper and lower surfaces u and v respectively constitute N and S poles while in its other half (g) on the other side of the afore-mentioned plane the upper and lower surfaces w and x respectively constitute N and S poles, that is, poles of opposite polarities are formed on the opposite sides of the plane abcd. The shaft 31b is pressure fitted in the rotor body 31a. It has a cylindrical portion $S_1$ received in a central bore of the rotor body 31a and an upwardly facing shoulder $S_2$ engaging the lower side of the rotor body 31a. Further, it has an integral rotor gear $S_3$. The rotor gear $S_3$ transmits the rotation of the rotor 31 to a gear train (not shown). The shaft 31b is rotatably supported within the wrist watch and rotates together with the rotor body 31a.

A pair of upper stators 32a and 32b are disposed above the rotor 31 and extend at right angles to the shaft 31b. They define two upper gaps $a_1$ and $a_2$. Another pair of stators, namely lower stators 33a and 33b, are disposed below the rotor 31 and extend at right angles to the shaft 31b. They define lower gaps $b_1$ and $b_2$ (the gap $b_2$ being not shown).

A yoke 34 bridges the upper stators 32a and 32b, and a drive coil 35 is wound on the yoke 34. The drive coil 35 magnetizes the upper stators 32a and 32b to respective opposite polarities. Another yoke 36 bridges the lower stators 33a and 33b, and another drive coil 37 is wound on the yoke 36. The drive coil 36 magnetizes the lower stators 33a and 33b to respective opposite polarities. When the upper stator 32a is magnetized to N pole, the other upper stator 32b is magnetized to S pole, while the lower stators 33a and 33b are respectively magnetized to S and N poles.

The upper and lower stators 32a and 33a are stacked together with a spacer 38 provided on one side, and the other upper and lower stators 32b and 33b are stacked together with another spacer 39 provided on the other side. The spacers 38 and 39 are made of a non-magnetic material such as brass. The upper stators 32a and 32b are magnetically coupled to the drive coil 36, while the lower stators 33a and 33b are magnetically coupled to the drive coil 37. The upper and lower stators and the spacers 38 and 39 are mechanically coupled together, with the drive coils 35 and 37 disposed on opposite sides, and define a space K, within which the rotor body 31a of the rotor 31 is accommodated such that the different poles on the upper surface face the respective upper gaps $a_1$ and $a_2$ and the different poles on the lower surface face the respective lower gaps $b_1$ and $b_2$.

Thus, when the upper stators 32a and 32b are respectively magnetized to N and S poles and the lower stators 33a and 33b respectively to S and N poles, the rotor 31 is brought to a position with its half (p) found between the upper and lower stators 32b and 33b and its other half (q) found between the other upper and lower stators 32a and 33a. Subsequently, when the upper stators 32a and 32b are magnetized to respective S and N poles and lower stators 33a and 33b to respective N and S poles, the rotor 31 is rotated to a position with its half (p) found between the upper and lower stators 32a and 33a and its other half (q) found between the other upper and lower stators 32b and 33b. When the upper stator 32a is again magnetized to N pole, the rotor 31 is further rotated with its half (p) brought to the side of the upper stator 32b. In this way, as the individual stators are alternately magnetized to the opposite polarities the rotor 31 is rotated in one direction due to alternate attraction and repulsion of its individual magnetic poles, and its rotation is transmitted via the rotor gear $S_3$ to the gear train as mentioned earlier.

In the two-pole pulse motor of the embodiment of FIGS. 4A to 4C as described above, where the opposite halfs of the rotor are axially magnetized in the mutually opposite directions, the stable operation region of the rotor is broad because the rotor is intermittently rotated by 180°in each step, so that there is no need of providing any restricting pawl for restricting the overrun of the rotor. In addition, the two-pole magnetization of the rotor of this type of two-pole pulse motor can be readily manufactured.

While the two-pole pulse motor shown in FIGS. 4A to 4C has the foregoing advantages, the invention may be applied not only to two-pole pulse motors of the afore-mentioned construction but in general to pulse motors using a multipole rotor axially magnetized and having a plurality of magnetization axes such that the direction of magnetization of each magnetization axis is opposite to that of the adjacent magnetization axis so that the rotor is rotated due to attraction and repulsion of its poles by the upper and lower pair stators.

Further, while in the embodiment of FIGS. 4A to 4C the upper and lower stators 32a and 33a are magnetized to the opposite polarity with respect to the other upper and lower stators 32b and 33b, they may be magnetized to the same polarity as well. In the latter case, a phase difference is required between the upper gaps $a_1$ and $a_2$ on one hand and the lower gaps $b_1$ and $b_2$ on the other hand in order to cause the rotation of the rotor.

As has been described in the foregoing, with the pulse motor, according to the invention, the rotor experiences magnetix attraction and repulsion at four portions, and also leakage flux is low. Thus, it is possible to obtain high magnetix efficiency and conversion efficiency. Further, since the number of portions experiencing the magnetix effects is increased, it is possible to minimize the effects of fluctuations of the rotor poles and provide strong rotor locking force and hence strong resistance against shocks. Thus, extremely steady and stable operation can be ensured. Still further, by encasing the pulse motor within a casing of a magnetic material, magnetic shielding against external fields can be readily achieved, while at the same time facilitating the handling of the whole. Yet further, high torque can be obtained with a small size pulse motor, which is best suited to a drive mechanism for a watch. Moreover, since the rotor is magnetized in the direction parallel to the shaft, it is possible to use inexpensive and strongly anisotropic magnets such as rare earth cobalt magnets for the rotor.

I claim:
1. A pulse motor comprising:
    a rotor having at least two magnetization axes extending parallel to the axis of rotation of said rotor and spaced apart at a uniform angular interval, the direction of magnetization of each said magnetization axis being opposite to that of the adjacent magnetization axis;
    a pair of upper stators extending above said rotor and defining two upper gaps, said upper gaps being adapted to face different poles different in polarity on the upper side of said rotor;
    a pair of lower stators extending below said rotor and defining two lower gaps, said lower gaps being adapted to face different poles different in polarity on the lower side of said rotor, said upper pair of stators and said lower pair of stators coupled together with said rotor sandwiched thereinbetween; and
    at least a first drive coil for magnetizing said upper and lower pair stators alternately to the opposite polarities such that the polarity of one of said upper pair of stators and one of said lower pair of stators is opposite to the polarity of the other upper and lower stator, said first drive coil being magnetically coupled to said upper and lower pair of stators.

2. The pulse motor according to claim 1, wherein the magnetization axes of said rotor are angularly spaced apart with respect to the axis of rotation of said rotor at an angular interval of 60 degrees, said upper and lower gaps defined by said upper and lower stators being symmetrical with respect to the axis of rotation of said rotor, said upper gaps being 60 degrees out-of-phase with respect to said lower gaps.

3. The pulse motor according to claim 1, wherein one of said upper pair of stators and one of said lower pair of stators are magnetically coupled to one side of said first drive coil while the other upper and lower stators are magnetically coupled to the other side of said drive coil.

4. The pulse motor according to claim 1, wherein one of said upper pair of stators and one of said lower pair of stators are magnetically coupled to said first drive coil while the other upper and lower stators are magnetically coupled to a second drive coil, said second drive coil adapted to cause magnetic excitation of a polarity opposite to that caused by said first drive coil.

5. The pulse motor according to claim 1, wherein said upper pair of stators are magnetically coupled to opposite sides of said first drive coil and said lower pair of stators are magnetically coupled to opposite sides of a second drive coil.

6. The pulse motor according to claim 4, wherein said first drive coil is wound on a core formed of (i) part of one of said upper pair of stators and (ii) part of one of said lower pair stators, and said second drive coil is wound on a core formed of (i) part of the other upper stator and (ii) part of the other lower stator.

7. The pulse motor according to claim 6, which further comprises a casing accommodating the rest of said pulse motor, said casing consisting of a side frame and upper and lower frames, said side from coupled to said upper and lower frame, wherein said side frame is made of a magnetic material.

8. The pulse motor according to claim 7, wherein said upper and lower frames are made of a magnetic material.

9. The pulse motor according to claim 1, wherein said rotor has six magnetization axes extending parallel to the axis of rotation.

10. The pulse motor according to claim 8, wherein each said magnetization axis is spaced apart by about 60°, and the direction of magnetization of each said axis is opposite to that of the adjacent one so as to form an alternating configuration.

11. The pulse motor according to claim 1, wherein said upper gaps are in alignment with respect to each other and extend across the diameter of said rotor adjacent to the top thereof.

12. The pulse motor according to claim 1, wherein said rotor has a plurality of magnetization axes extending parallel to the axis of rotation of said rotor and spaced intervals according to the formula $180/(l+1)°$, wherein $l$ is a positive integer.

* * * * *